Figure 1:
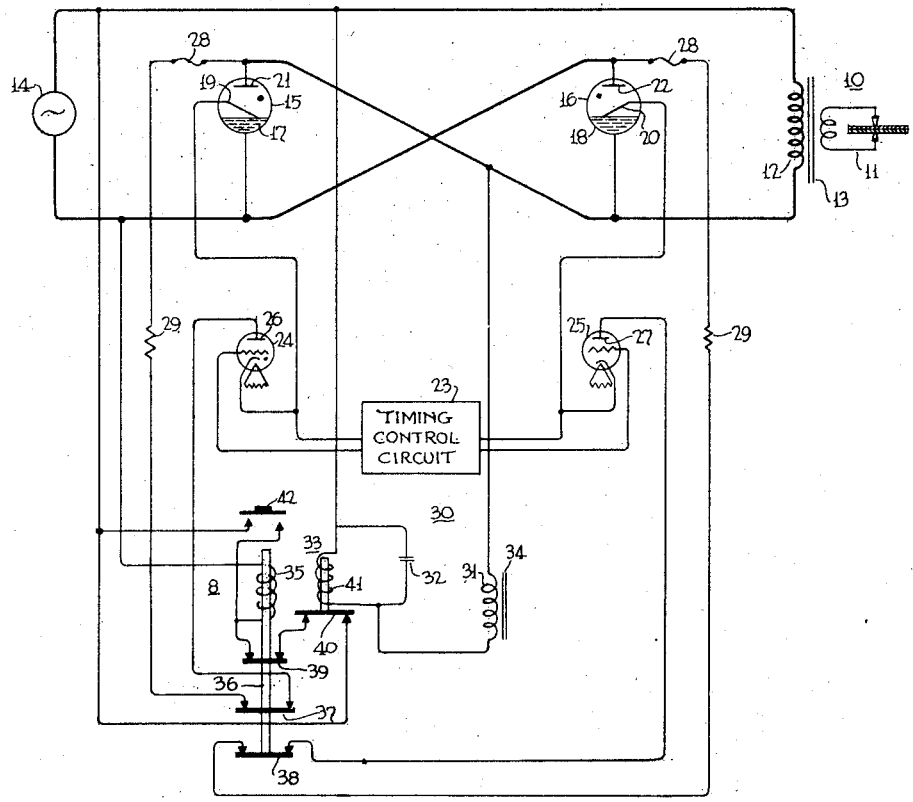

INVENTORS:
John R. Fetcher
Robert S. Phair
BY John P Tarbox
ATTORNEY

Patented Feb. 12, 1946

2,394,903

UNITED STATES PATENT OFFICE 2,394,903

HALF-CYCLING PROTECTIVE RELAY SYSTEM

John R. Fetcher and Robert S. Phair, Philadelphia, Pa., assignors to Edward G. Budd Mfg. Company, Philadelphia, Pa., a corporation of Pennsylvania Application July 4, 1942, Serial No. 449,748

16 Claims. (Cl. 175—294)

This invention relates to protective apparatus for electric circuits, and particularly to means for protecting electric circuits such as those including welding apparatus from overload effects due to the failure of one of the electric tubes to function.

In electric welding circuits, it is usual to employ between the alternating current power source and the welding transformer reversely placed electric power tubes of the pool cathode type, frequently referred to as Ignitrons. These tubes alternately transmit current in the load circuit in opposite directions, each tube functioning to permit current flow in one direction only. Thus, the magnetic effect upon the welding transformer core is such as to secure a magnetic balance. Should, however, one power tube fail to function, through various causes, such as too critical power factor setting, over compensation of voltage-drop-compensator, failure of either power tube or a control tube connected to the power tube, or a blown control fuse, the result on the load circuit is a series of unidirectional current impulses which serves to build up cumulatively the magnetic field of the welding transformer core until it is saturated. Thereafter the diminishing reactance of the circuit permits excessively large current flow in the load circuit, thus causing severe line disturbances, blowing of fuses, opening of overload breakers, possible damage to welding transformer or to the remaining properly functioning power tube as well as unsatisfactory welds due to the disturbance of the timing, current flow and transformer action.

It is accordingly one of the objects of the present invention to provide protective means effective to disconnect or disable the remaining power tube should one tube for any reason fail to function properly. Another object is to provide protective means which is permanently connected, in the welding circuit, for example, and is easily reset so that after correction of the trouble no extensive manipulation of the circuit is necessary to place the protective means in condition for actuation after performing its protective function. Still another object is to provide a protective circuit arrangement wherein apparatus is included without high inertia parts, that is, movable elements which do not follow closely the cyclical movement of the alternating current. An object also is to provide a protective system which functions practically instantaueously with failure of one of the Ignitrons to fire, that is, within one to five cycles of current alternation after disability. Objects included in this invention also are the provision of protective means wherein the magnetic effects of the welding transformer are essentially duplicated thereby assuring parallel action; wherein adjustable means are provided to secure effective action; wherein the operative element of the protective circuit under normal conditions of operation takes current substantially below the operating point at which the protective action is begun; wherein the protective operation takes place at different timing points in the welding circuit and wherein the number of necessary parts are reduced in number so that the costs of parts, difficulties in adjustment and assembly are reduced to a minimum.

Figure 2:
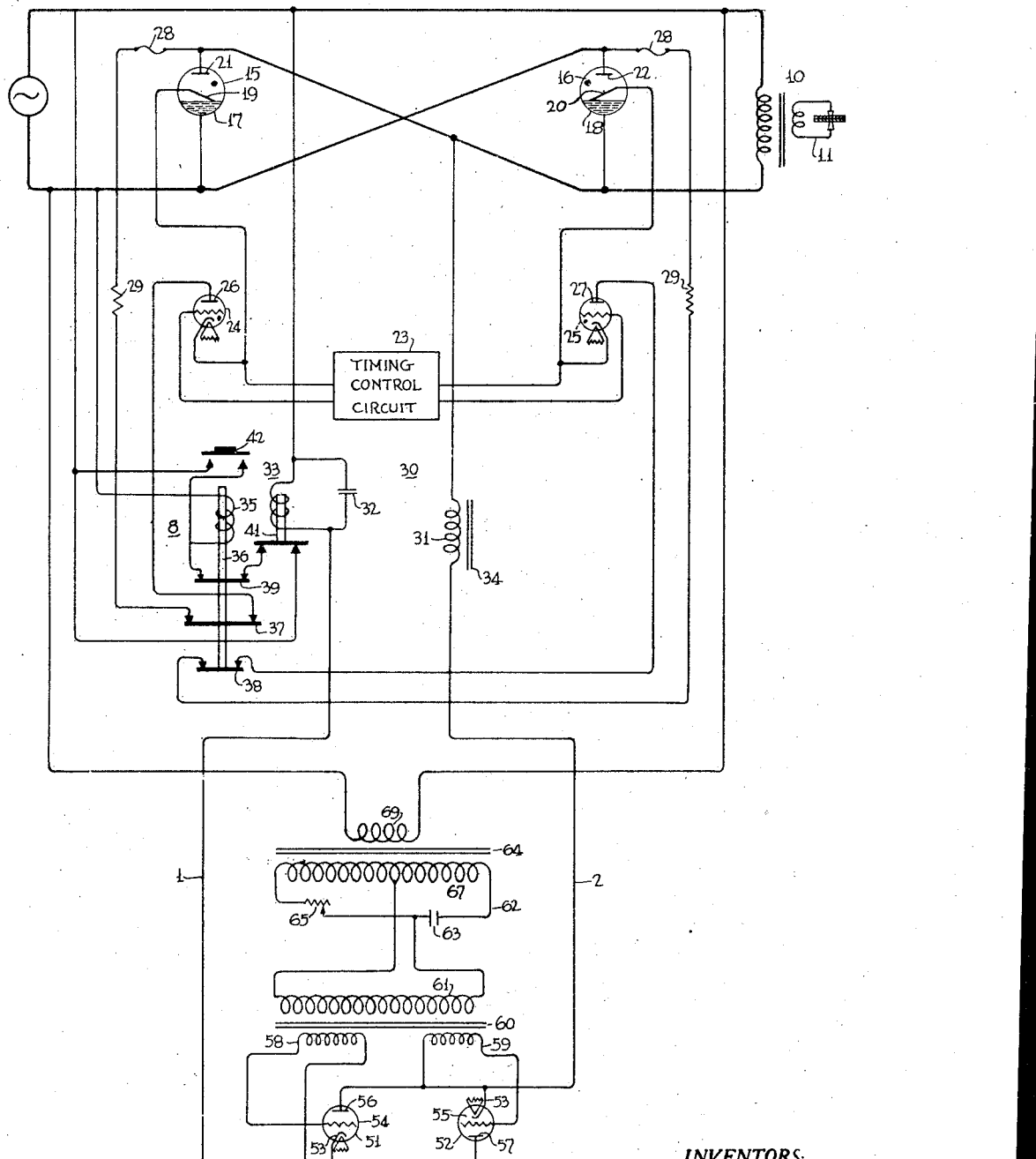
Figure 3:
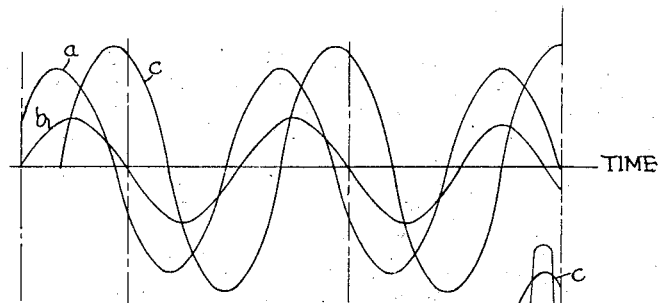
Figure 4:
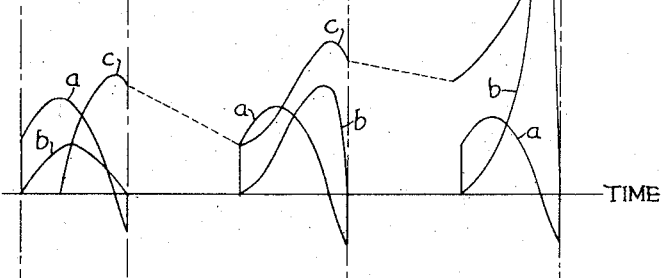
Figure 5:
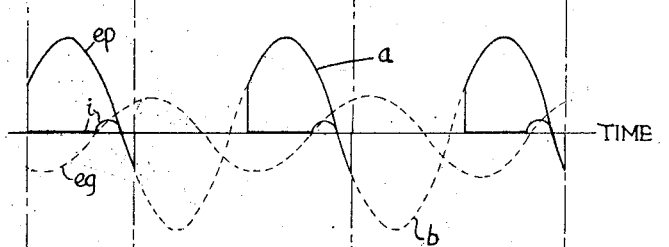
Figure 6:
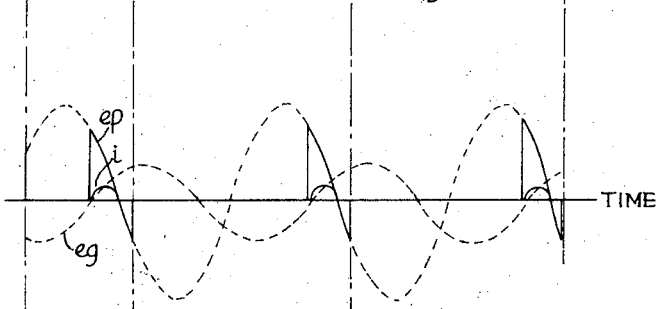

Other objects will appear on consideration of the modifications of the invention described hereinbelow, which may be preferred considered in conjunction with the accompanying drawings. Figure 1 is a view of a conventional welding circuit shown in conjunction with our protective circuit. Figure 2 is a view similar to Figure 1, but showing a modified form of the protective means. Figure 3 is a set of curves illustrating the sinusoidal curve of line voltage and current as applied to the load and the consequential flux distribution in the welding transformer when both ignitrons are functioning normally. Figure 4 is a view illustrating the modification of voltage, current and magnetic flux when one of the ignitrons fails to fire. Figure 5 shows characteristic curves of voltage and current under full wave conditions with controlled rectifier tubes in the protective relay circuit, and Figure 6 shows curves as in Figure 5, but under conditions of partial current wave.

Referring now to the showing of Figure 1, there is disclosed therein a welding transformer 10 having a secondary 11, primary 12 and core 13, the primary being supplied by alternating current from a power source 14. A pair of ignitrons or electric discharge tubes 15 and 16 preferably of the gaseous or vapor type employing pool cathodes 17 and 18 with electrically energized igniter elements 19 and 20 is interposed in the circuit in inverse-parallel relationship, between the electric power source and load. As is conventional, the anodes 21 and 22 are each respectively connected to the cathodes, 18 and 17 of the other tubes so that when the igniter elements 19 and 20 are alternatively energized in successive alternations of the current cycle, the current will flow alternately through the tubes, the direction of flow being from anode to cathode. This alternate flow, of course, is dependent upon whether or not the welding system circuits and apparatus are functioning normally.

The igniter elements 19 and 20 are connected to the timing control circuit 23 which may be of any of the forms now in use, and which, therefore, is not indicated in detail. Through the functioning of the timing control circuit, energy is applied alternately to the igniter elements 19 and 20 of the electric tubes 15 and 16, bringing about firing at the appropriate points in the cycle of current alternation for which the timing periods are set. As a part of the timing control circuits, there are shown the control tubes 24 and 25, of the gaseous type, having cathodes and grids connected directly to the timing control circuits and anodes 26 and 27, each of which are connected through switching mechanism and fuses 28 and resistances 29 to the anodes 21 and 22 of the main power tubes 15 and 16.

The general procedure of the invention by means of which overload and other undesirable effects in the welding circuit due to the failure of one of the main power tubes is prevented, consists in the use of relay mechanism operable under certain conditions of reactance in a circuit placed in parallel with the primary of the welding transformer. The circuits and apparatus for accomplishing this protective action are generally indicated by the numeral 30 and include an inductive reactor 31 in series with two parallel circuits, one containing an impedance 32 and the other a relay 33, these three elements forming a part of the parallel circuit about the welding transformer primary. The reactor 31 is of the saturable type having a saturable core 34. The impedance 32 is shown as of the capacitive type, but it should be understood that other forms of impedance may be used or under some conditions, the impedance may be eliminated entirely.

The relay 33 is of the alternating current inductive type and is so constructed that when energized through failure of one of the main power tubes, it opens the circuit between the anodes 21 and 22 of the power tubes 15 and 16 and the anodes 26 and 27 of the control valves 24 and 25. To accomplish this result, an electro-magnet 8 is employed which for purposes of illustration is shown as a vertically positioned solenoid 35 having a movable core 36 provided with contact plates 37 and 38, the plate 37 forming a switch bridge between contacts in the anode circuits of tubes 15 and 24 and the plate 38 bridging contacts in the anode circuits of tubes 16 and 25. A third plate 39 is also attached to the core 36, being adapted to bridge the contacts in the circuit from the solenoid 35 to contacts bridged by the contact plate 40 attached to the core 41 of the relay 33. Plate 40 normally bridges its contacts by gravity but through energization of the relay 33 the plate is lifted and the circuit broken.

Plates 39, 37 and 38, attached to core 36 of electromagnet 34, are normally displaced from their associated contacts but close the same when the solenoid 35 is energized. The solenoid 35, plate 39 thereof, plate 40 of relay 33 are series elements in a circuit across the main power source so that current is derived directly from the power means when the electro-magnet 8 is energized and relay 33 is de-energized. A reset circuit including manual reset switch 42 is attached around the solenoid 35 to close contact plates 39, 37 and 38 after opening due to a defective action of one of the main power tubes.

The general mode of operation will now be detailed. Assuming a normal state of functioning of various elements of the welding circuit, alternating current when applied to the main circuit will impose a sinusoidal voltage wave, such as indicated by $a$ in Figure 3, the current wave $b$ lagging in accordance with the inductive characteristics of the circuit, and, the flux curve $c$, lagging 90° behind the voltage wave and also following an approximately sinusoidal form. Under such conditions of operation a balanced reversing magnetic field exists in the core 34 of the saturable reactor 31, thus inducing a back E. M. F. which in effect is the reactance drop, thereby limiting the protective circuit current to a small value. This current substantially by-passes relay 33 through capacitance 32. Should, however, one of the main power tubes fail to function for any reason, through deficiency in the tube or the external circuits, there will be impressed not only on the welding transformer core 13, but also on the core 34 of the reactor 31 a series of unidirectional current impulses resulting in unidirectional impulses of magnetic flux in the transformer cores 13 and 34.

It will be apparent from the magnetization curves that magnetizing current will tend to build up cumulatively with the increasing build-up in magnetic flux, cycle by cycle, as illustrated in Figure 4. In this figure, successive values of the voltage $a$, current $b$, and magnetic flux $c$ are shown wherein this effect is apparent. The current is obviously one-way current, that is, since only one of the power tubes functions, the current can pass to the welding circuit in one direction only. As a result of this unidirectional and increasing magnetic flux, the current $b$ increases rapidly and cumulatively.

The residual field $c$ tends to drop after each half cycle impulse of the current, but this reduction is not returned to zero before the next impulse of magnetic flux is added. Under these conditions, the welding transformer core is saturated and the current steps up quickly to excessive values.

With this action in the welding transformer, a pulsating voltage is also impressed on the protective shunt circuit 30, which similarly produces a cumulative increment in current and magnetic flux in the core 34. Similarly, there will be a decrement in residual magnetism in the core 34 after each half cycle impulse of the current, the rate of decline depending upon the time constant of the circuit.

After the first few pulses of unidirectional current, the reactor core 34 becomes saturated, and a reduction in reactance results, thus imposing a pulsating and increasing voltage on the relay-capacitance circuit of sufficient value to force current through the relay and energize the same to open the contacts bridged by plate 40. Thereupon, solenoid circuit 35 is de-energized, thus opening the series of contacts bridged by solenoid plates 39, 37 and 38, and the anodes circuits connecting main power tubes 15 and 16 to control tubes 24 and 25 are broken, and both main tubes are disabled for the transmission of the current in the main load circuit.

The core 34 of the saturable reactor 31 is so designed as to reach the saturation point, and thereby permit actuation of the protective relay within a few cycles of current alternations, generally not over five under normal load conditions. In this time interval, there will be no opportunity for the rapidly increasing current to do any damage in the circuit. It will be noted that the relay 33 acts merely as a control element in bringing about a non-reversible opening of the circuits; hence a chance closure of the contacts bridged by circuits of the relay 33 will not bring the main power valves into the circuit or produce chattering. After operation of the relay as hereinabove described, and correction of the fault producing the power tube failure, the electromagnet 34 with its associated contacts is closed by means of the reset manual switch 42. This switch directly bridges the power supply circuit through the solenoid 35, closing the contacts controlled by switch plate 39, plate 40 having bridged its contacts previously through gravity. Plates 37 and 38 also bridge their respective contacts.

Referring to Figure 4 of the drawings, it is observable that the voltage curves in successive half cycles falls below the zero line to produce a voltage pulse in the opposite direction from that of the normal functioning of the remaining main valve. We have found that under certain conditions of operation, such as with partial current wave and relatively large power factor lag, this reverse peak of the voltage is undesirable in that it tends to increase the time of saturation and thus delay the opening of the main tube circuits. While other means are available, we find it effective to cancel the influence of this negative portion of the voltage wave by means of a controlled rectifier circuit, as shown in the form of the invention illustrated in Figure 2. In this figure, the same basic circuit is employed, as in Figure 1, with the exception that there is included in the protective parallel circuit the current control circuit 50. This control circuit includes the rectifying tubes 51 and 52 of the vacuum type, each having cathodes 13, grids 54 and 55, and plates 56 and 57. The plate of each of these rectifying tubes is connected to the cathode of the other tube; the cathodes are also connected through secondaries 58 and 59 of transformer 60 to the respective grids 54 and 55 of the same tubes. The primary 61 of transformer 60 forms a bridge across the phase shifting circuit 62, which consists of a variable resistance 65 and capacitance 63 connected in series across the secondary 67 of transformer 64. The phase shifted voltage is obtained between the juncture of resistance 65 and capacitance 63 and the midpoint of the secondary 67 of transformer 64. The primary 68 of transformer 64 is conected across the source of the power supply.

On examination of the rectifier tube circuit generally indicated by 50, it will be apparent that the anodes shown as 56 and 57 are reversely connected to opposite sides of the circuit, and are, therefore, adapted to receive alternate voltage impulses during the normal operation of the welding circuit, but on failure of one of the main valves will transmit current in one direction only. The potential on the anodes 56 and 57 of the auxiliary tubes normally follows the voltage curve of the power source, as indicated by curve $e_p$ which includes the full line section $a$ and dotted line section $b$ in Figure 5 of the drawings. Curves $e_p$, $i$, and $e_g$ represent respectively instantaneous values of plate voltage, plate current and grid voltage in the tubes 51 and 52. It is apparent that in order to cancel the effect of the negative portion of the voltage curve, as shown on Figure 4, it will be necessary to change the phase relationship of the grid voltage in relation to that impressed on the anodes to such an angle that in the time period when the line voltage turns negative it is neutralized. This is accomplished by a phase lag of approximately 130° of the grid over the plate voltage, this phase angle of course being adjustable by means of the manually variable resistor 65 within a range necessary to produce the desired results.

Figure 5 illustrates the operation of the auxiliary tube control on the negative voltage peak in the case of main volve failure in that no current is permitted to flow when the voltage reverses sign, the current passed remaining approximately zero during the half cycle, except for the interval where the grid and plate voltages are on the same side of the zero line. This produces a series of unidirectional current pulses of sufficient value to cause operation of the relay with its associated circuits and thus to open the exciting circuits of both of the main power tubes.

Reference to Figure 6 of the drawings will make clear that the rectifier tubes function on low load as well as on approximately full load, since the sector of the cycle in which the tubes are affected is adjacent the reversing point of the voltage current.

Using the rectifier tube system 50 in this fashion diminishes the relative necessity and value of the saturable inductive reactance 31, in that fairly satisfactory results may be obtained without this reactor. However, the reactor 31 serves to produce a marked step-up in the voltage as applied to the protective shunt circuit, and hence will tend to eliminate chattering of the relay at the operating point. While in the case of small loads, as shown in Figure 6, the current values are zero, except at the time period when the voltage is applied, in the case shown in Figure 5, where the line voltages are impressed on the plate for a major portion of the half cycle, there will be, in addition to the terminal current pulse, a small amount of current during the prior time period of the load.

As shown in Figures 1 and 2, and described hereinabove, circuits and elements are included which experimentally and practically operate efficiently in the manner indicated. However, it is apparent that modifications may be made of the apparatus, circuits, and elements thereof which are equivalent in their functioning. For example, instead of ignitrons employing pool cathodes, other types of gaseous tubes may be used such as the grid controlled thyratrons. Hence the disclosed system is primarily illustrative, the limits of the invention being defined by the claims as hereto appended.

What is claimed is:

1. A protective system for electrical apparatus comprising in combination an alternating current supply circuit, an alternating current load circuit, inverse parallel connected electronic tubes interconnecting said circuits for transmission of energy therebetween each including an actuating element for controlling the conductivity thereof, an actuating circuit including said actuating element for timing the actuation of each of said tubes, and protective means connected directly across said load circuit and effective on the failure of one of said tubes to conduct current for opening both of said actuating circuits, said means including a relay and a saturable reactor in series therewith.

2. A protective system for electrical apparatus comprising in combination an alternating current supply circuit, an alternating current load circuit, inverse parallel connected electronic tubes interconnecting said circuits, each including an actuating element for controlling the conductivity thereof, an actuating circuit including said actuating element for timing the actuation of each of said tubes, an auxiliary circuit directly connected in parallel by continuous conductors to said load circuit, one of said tubes being adapted to pass unidirectional current through the load and auxiliary circuits on failure of the other tube and protective means in said auxiliary circuit, effective on flow of unidirectional current through said load and parallel circuit for opening both of said actuating circuits.

3. A protective system for translating devices comprising in combination an alternating current supply circuit, an alternating current load circuit, inverse parallel connected electronic tubes interconnecting said circuits, and protective means connected with said load circuit for opening the tube circuits on failure of one of said tubes, said protective means including a relay directly connected to the load circuit by continuous conductors, and an impedance in parallel with said relay.

4. A protective system for translating devices comprising in combination an alternating current supply circuit, an alternating current load circuit, inverse parallel connected electronic tubes interconnecting said circuits, and protective means connected with said load circuit for opening the tube circuits on failure of one of said tubes, said protective means including a relay directly connected to the load circuit by continuous conductors, and a capacitance in parallel with said relay.

5. A protective system for translating devices comprising in combination an alternating current supply circuit, an alternating current load circuit, inverse parallel connected electronic tubes interconnecting said circuits, each including an actuating element for controlling the conductivity thereof, an actuating circuit for timing the actuation of each of said tubes, and protective means connected directly to said load circuit, said protective means including a relay, an impedance in parallel with said relay and an inductive reactance in series with the relay-impedance circuit.

6. A protective system for translating devices comprising in combination an alternating current supply circuit, an alternating current load circuit, inverse parallel connected electronic tubes interconnecting said circuits, each including an actuating element for controlling the conductivity thereof, an actuating circuit including said actuating element for timing the actuation of each of said tubes, and protective means connected in parallel with said load circuit, said protective means including a relay, an impedance in parallel with said relay and a saturable inductive reactance in series with the relay-impedance circuit.

7. A protective system for translating devices comprising in combination an alternating current supply circuit, an alternating current load circuit, inverse parallel connected electronic tubes interconnecting said circuits, each including an actuating element for controlling the conductivity thereof, an actuating circuit including said actuating element for timing the actuation of each of said tubes, and protective means connected with said load circuit, said protective means including a relay directly connected to the load circuit by continuous conductors, and inverse-parallel connected rectifying tubes having anode, cathode and grid elements connected in series-parallel with said relay, phase shift means connected to be energized from the source of alternating current for controlling the phase of the grid voltages of said rectifying tubes in relation to the phase of the tube anodes thereof, and transformer means interposed between said auxiliary tubes and phase shift means.

8. A protective system for translating devices comprising in combination an alternating current supply circuit, an alternating current load circuit, inverse parallel connected electronic tubes interconnecting said circuits, each including an actuator element for controlling the conductivity thereof, an actuating circuit including said actuator element for timing the actuation of each of said tubes, and protective means connected with said load circuit, said protective means including a relay directly connected to the load circuit by continuous conductors, and inverse-parallel connected auxiliary electric tubes connected in series parallel with said relay, each tube including an anode, cathode and grid, and means for impressing on the grids of said auxiliary tubes a phase change differing by over 90° and less than the 180° from the phase impressed by the supply circuit on the valve anodes.

9. A protective system for translating devices comprising in combination an alternating current supply circuit, an alternating current load circuit, inverse parallel connected electronic tubes interconnecting said circuits, each including an actuator element for controlling the conductivity thereof, an actuating circuit including said actuator element for timing the actuation of each of said tubes, and protective means connected in parallel with said load circuit, said protective means including a relay directly connected to the load circuit by continuous conductors, and inverse-parallel connected auxiliary electric tubes connected in series parallel with said relay, each tube including an anode, cathode and grid, and means for impressing on the girds of said auxiliary tubes a phase change differing by over 90° and less than the 180° from the phase impressed by the supply circuit on the tube anodes, said phase change means including an impedance bridge inductively connected to the current supply source and to the grid circuits of said auxiliary tubes.

10. A protective system for electrical apparatus comprising in combination an alternating supply source, an alternating current load circuit containing an inductive impedance inverse parallel connected electronic tubes interconnecting said circuits for transmission of energy therebetween each including an actuating element for controlling the conductivity thereof, an actuating circuit including said actuating element for timing the actuation of each of said tubes, and protective means connected in parallel with said load circuit effective on failure of one of said tubes to disconnect said actuating circuits, said protective means including a relay and impedance connected in parallel with each other, inverse-parallel connected rectifier electronic tubes connected in parallel with each other and in series with the relay and impedance circuit, and means connecting said rectifying tubes and power source for controlling the flow of current through said rectifying tubes.

11. A protective system for electrical apparatus comprising in combination an alternating supply source, an alternating current load circuit containing an inductive impedance, inverse parallel connected electronic tubes interconnecting said circuits for transmission of energy therebetween, each including an actuating element for controlling the conductivity thereof, an actuating circuit including said actuating element for timing the actuation of each of said tubes, and protective means connected in parallel with said load circuit effective on failure of one of said tubes to disconnect said actuating circuits, said protective means including a relay and impedance connected in parallel with each other, inverse-parallel connected rectifying tubes connected in parallel with each other and in series with the relay and impedance circuit, means connecting said rectifying tubes and power source for controlling the flow of current through said rectifying tubes, and a saturable inductive reactance in series with the relay-impedance and rectifying tube circuits.

12. A protective system for electrical apparatus comprising in combination an alternating supply source, an alternating current load circuit containing an inductive impedance, inverse-parallel connected electronic tubes interconnecting said circuits for transmission of energy therebetween, each including an actuating element for controlling the conductivity thereof, an actuating circuit including said actuating element for timing the actuation of each of said tubes, and protective means connected in parallel with said load circuit effective on failure of one of said tubes to disconnect said actuating circuits, said protective means including a relay, inverse-parallel connected rectifying tubes connected in parallel with each other, and means connecting said rectifying tubes and power source for controlling the flow of current through said rectifying tubes, and a saturable reactance, said relay-rectifying tube circuit and reactance being connected in series.

13. A protective system for translating devices comprising in combination an alternating current supply circuit, an alternating current load circuit, inverse parallel connected electronic tubes interconnecting said circuits, each including an actuator element for controlling the conductivity thereof, an actuating circuit including said actuator element for timing the actuation of each of said tubes, and protective means connected in parallel with said load circuit, said protective means including a main relay, an impedance in parallel with said relay, a saturable inductive reactance in series with the relay-impedance circuit, and a dependent relay operable on functioning of said main relay for opening both of said actuating circuits.

14. A protective system for translating devices comprising in combination an alternating current supply circuit, an alternating current load circuit, inverse parallel connected electronic tubes interconnecting said circuits, each including an actuator element for controlling the conductivity thereof, an actuating circuit including said actuator element for timing the actuation of each of said tubes, and protective means connected in parallel with said load circuit, said protective means including a main relay, an impedance in parallel with said relay, a saturable inductive reactance in series with the relay-impedance circuit, a dependent relay connected to said supply circuit and operable on functioning of said main relay for opening both of said actuating circuits, and reset means for re-establishing said actuating circuits.

15. A protective system for electrical apparatus comprising in combination an alternating supply source, an alternating current load circuit containing an inductive impedance, inverse parallel connected electronic tubes interconnecting said circuits for transmission of power therebetween each including an actuating element for controlling the conductivity thereof, an actuating circuit including said actuating element for timing the actuation of each of said tubes, and protective means connected in parallel with said load circuit effective on failure of one of said tubes to disconnect said actuating circuits, said protective means including a main relay and impedance connected in parallel with each other and by direct conductor connection to said load circuit, inverse-connected rectifier electronic tubes connected in parallel with each other and in series with the relay and impedance circuit, and a secondary relay connected to said power supply control switch elements in said actuating circuits, said secondary relay being normally de-energized by energization of said main relay.

16. A protective system for electrical apparatus comprising in combination an alternating current supply circuit, an alternating current load circuit, inverse parallel connected electronic tubes interconnecting said circuits for transmission of energy therebetween, each including an actuating element for controlling the conductivity thereof, an actuating circuit including said actuating element for timing the actuation of each of said tubes, and protective means connected directly by continuous conductors to said tubes, effective on the failure of one of said tubes to conduct current for opening both of said actuating circuits.

JOHN R. FETCHER.
ROBERT S. PHAIR.